United States Patent
Melzer et al.

(10) Patent No.: US 7,323,031 B2
(45) Date of Patent: Jan. 29, 2008

(54) ZINC POWDER OR ZINC ALLOY POWDER WITH INHOMOGENEOUS BULK DENSITY FOR ALKALINE BATTERIES

(75) Inventors: Armin Melzer, Dinslaken (DE); Petra Merkel, Bad Harzburg (DE); Jochen Spriestersbach, Duisburg (DE); Rudi Kube, Bad Harzburg (DE); Norbert Schulz, Bad Harzburg (DE)

(73) Assignee: Grillo-Werke AG, Duisburg (DE)

( * ) Notice: Subject to any disclaimer, the term of this patent is extended or adjusted under 35 U.S.C. 154(b) by 580 days.

(21) Appl. No.: 10/754,271

(22) Filed: Jan. 9, 2004

(65) Prior Publication Data

US 2004/0187640 A1    Sep. 30, 2004

(51) Int. Cl.
*B22F 1/00* (2006.01)
(52) U.S. Cl. ........................................... 75/255
(58) Field of Classification Search ................. 75/255; 429/229
See application file for complete search history.

(56) References Cited

U.S. PATENT DOCUMENTS 6,022,639 A * 2/2000 Urry .......................... 429/229

2002/0150814 A1 * 10/2002 Causton et al. ............... 429/82
2004/0115532 A1 * 6/2004 Malservisi et al. ......... 429/229

FOREIGN PATENT DOCUMENTS

| JP | 53089811 | 8/1978 |
| JP | 2002270164 | 9/2002 |
| WO | WO 01/40529 A2 | 6/2001 |

* cited by examiner

*Primary Examiner*—Roy King
*Assistant Examiner*—Ngoclan T. Mai
(74) *Attorney, Agent, or Firm*—Sutherland Asbill & Brennan LLP

(57) ABSTRACT

The invention relates to zinc powders or zinc alloy powders with an inhomogeneous bulk density distribution depending on the particle size, wherein the difference of the bulk density measured according to ASTM B212 in the particle size range smaller than 75 μm and that in the particle size range greater than 150 μm is at least 0.5 g/cm$^3$, and the mean bulk density of the powder, measured according to ASTM B212, ranges from 1.8 to 4.0 g/cm$^3$. The invention is also directed to mixtures of said zinc powders or zinc alloy powders and to an alkaline battery including said powders.

19 Claims, 3 Drawing Sheets

ZINC POWDER OR ZINC ALLOY POWDER WITH INHOMOGENEOUS BULK DENSITY FOR ALKALINE BATTERIES

The invention is directed to a graduated zinc powder or zinc alloy powder for alkaline batteries, which powder has an inhomogeneous bulk density depending on the particle size distribution, to mixtures of zinc powders and zinc alloy powders, and to an alkaline battery wherein the zinc powders or zinc alloy powders of the invention are employed as electrode.

A large number of various alloyed zinc powders for use in alkaline batteries have been described in the prior art. Therein, the zinc powders are alloyed in various ways. Conventionally, zinc powders free of mercury, cadmium and preferably also free of lead are used. When used in alkaline batteries, such zinc powders involve the disadvantage of gradual decomposition with evolution of gas as a result of various reaction processes, thereby adversely affecting the durability, shelf life, as well as the electrical properties of the battery. To prevent this, alloys of zinc powder including minor amounts of other metals have mostly been used for battery purposes. Essentially, indium, bismuth, aluminum, magnesium, and calcium are mentioned in the prior art as alloy elements which reduce battery gassing. When used in batteries, these alloy components are added with the aim of obtaining battery gassing as low as possible, thereby increasing the shelf life and safety of the batteries during use.

However, the technical demands on batteries have increased substantially in recent years. In particular, the demands on batteries and their electrical performance have increased considerably as a result of the enormous expansion of mobile appliances in the sector of digital communication and entertainment electronics, such as digital cameras, cellular phones, CD players, MP-3 players, lap-tops, etc. As a result, attempts are now being made to improve the electrical properties not only by alloy-technological means, but also by modifying the morphology of the zinc powder or zinc powder alloys, e.g. by modifying the powder distribution, particle shape and bulk density of the employed zinc powders or zinc alloy powders. According to the present state of the art, zinc powders or zinc alloy powders are generally used wherein the particle size spans a wide range of about 20 to 500 μm.

Thus, WO 00/74157 A1 describes a mixture of zinc powder or zinc alloy powder and a liquid electrolytic medium, wherein the volume of the medium approximately corresponds to the interstices between the particles in dry bulk. These particles have a bulk density less than 2.8 g/cm$^3$. The purpose of this development is to achieve direct contact between virtually all of the particles in a way that sufficient liquid electrolytic medium is still present to dissolve the metal and/or alloy particles, thereby generating electricity.

Similarly, WO 01/03209 A1 describes a mixture of zinc or zinc alloy particles and a liquid electrolytic medium wherein the bulk density is even lower and is about 2.3 g/cm$^3$.

WO 99/07030 A1 describes zinc powders or zinc alloy powders for use in alkaline batteries, said zinc or zinc alloys being admixed with varying amounts of extremely fine particles having a size of 200 mesh or less (corresponding to a particle diameter of ≦74 μm). Such admixture of fine zinc particles has been found to result in an improvement in the electrical properties of the battery, particularly an improvement in the maximum discharge rate. Said rate defines the period of time within which electric voltage can be obtained from a battery under load, with no drop of the battery voltage below a specific value. This quantity is particularly important for uses in the high-power sector, particularly in cellular phones and other electronic products which normally measure the battery voltage and signal the user in case of a voltage drop under load that the batteries need to be replaced. With conventional batteries, this also occurs in those cases where the battery per se still has sufficient capacity but the voltage drops under load in the high-power range. Due to the signal from the appliance, these batteries are then replaced untimely and unnecessarily despite sufficiently available capacity.

To solve this problem, the EP 02,009,501.4, an application filed by the applicant of the present invention, suggests a zinc powder or zinc alloy powder wherein 60 to 100 wt.-% of the particles of the zinc powder or zinc alloy powder have a diameter of from 40 to 140 μm. Preferably, this powder has a relatively high density, with bulk densities ranging from 2.9 to 4.5 g/cm$^3$, and exhibits favorable gassing properties.

The demands on zinc powders and zinc alloy powders for use in electric batteries vary considerably, and to date, no success has been made in developing a zinc powder or zinc alloy powder that achieves an improvement in all of the test procedures and, in particular, has low battery gassing. For example, this can also be seen in the WO 99/07030 described above. In the examples described therein, battery gassing of zinc powders and zinc alloy powders suitable for high-power uses has not been investigated, and it must be assumed that the battery properties are not optimal.

It was therefore the technical object of the invention to provide a zinc powder or zinc alloy powder which has outstanding electrical properties for use in alkaline batteries, low battery gassing and, in particular, suitability for high-power uses.

Said object is accomplished by means of a graduated zinc powder or zinc alloy powder for alkaline batteries, which powder has an inhomogeneous bulk density distribution depending on the particle size, the difference of the bulk density measured according to ASTM B212 in the particle size range smaller than 75 μm and that in the particle size range greater than 150 μm being at least 0.5 g/cm$^3$, preferably from 0.5 g/cm$^3$ to 2.0 g/cm$^3$, and the mean bulk density of the powder, measured according to ASTM B212, ranging from 1.8 to 4.0 g/cm$^3$.

As has been determined, it is precisely this inhomogeneous bulk density distribution which results in extraordinarily positive battery properties. The battery properties can even be improved by mixtures thereof, but also by using standard powders. The greater the inhomogeneity of the zinc powders, the more favorable the battery properties will be, particularly in the high-power range.

In a preferred embodiment, the differences of the bulk densities depending on the particle size have a distribution as follows:
  smaller than 75 μm vs. smaller than 100 to 75 μm of at least 0.13 g/cm$^3$, preferably from 0.15 to 0.5 g/cm$^3$;
  smaller than 100 to 75 μm vs. smaller than 150 to 100 μm of at least 0.13 g/cm$^3$, preferably from 0.15 to 0.5 g/cm$^3$;
  smaller than 150 to 100 μm vs. 250 to 150 μm of at least 0.13 g/cm$^3$, preferably from 0.15 to 0.5 g/cm$^3$.

The size of the particles can be from 20 to 1000 μm, relative to the zinc powder or zinc alloy powder.

Furthermore, the particles of the zinc powder or zinc alloy powder having a diameter of up to 75 μm preferably have a more spherical particle shape and assume a needle-like or platelet shape with increasing particle size.

Particle size distribution in the meaning of the invention is understood to be the distribution of the particle size in the zinc powder or zinc alloy powder, the size of the particles being specified as diameter in μm. The particle size distribution was determined according to ASTM B 214. In the meaning of the invention, bulk density is understood to be the quotient of mass and occupied volume which also includes interstices and additional cavities, if present. Said bulk density is measured according to ASTM B 212.

When referring to zinc powder or zinc alloy powder in this specification, these are intended to be types of zinc which, with respect to their purity, are suitable for battery uses in accordance with the prior art. Conventional types of zinc being used have a purity of 99.99 wt.-%, 99.995 wt.-% or 99.999 wt.-%. Alloy data given in this specification refer to the amount of alloying elements, i.e., not to impurities possibly present in the zinc powder. The quantities given in context with the zinc alloys are to be taken such that the respective amount of alloy element is alloyed, with the remainder being zinc.

The zinc powder or zinc alloy powder according to the invention has a specific particle size distribution, the bulk density varying strongly with the particle size. It has outstanding electrical properties, particularly when used in alkaline batteries. Compared to conventional prior art zinc powders, battery gassing is lower, resulting in a substantially increased durability and shelf life of alkaline batteries employing the zinc powders or zinc alloy powders according to the invention.

With respect to alloy technology, the zinc powder is not restricted in any way and thus, conventional alloy elements for zinc powders, i.e., indium, bismuth, lead, aluminum, calcium, lithium and magnesium, or mixtures thereof, can be used as alloy elements. In a preferred fashion, one or more alloy elements are included in the following amounts: indium 0.1 to 1200 ppm, bismuth 0.1 to 1000 ppm, lead 0.1 to 1000 ppm, aluminum 0.1 to 200 ppm, calcium 0.1 to 200 ppm, magnesium 0.1 to 200 ppm, as well as alkali metals such as sodium 0.1 to 200 ppm and/or lithium 0.1 to 200 ppm.

The following alloys are particularly preferred: 0.1 to 1200 ppm indium, preferably 100 to 850 ppm indium, and 0.1 to 1000 ppm bismuth, preferably 50 to 500 ppm bismuth.

Also preferred is an alloy including 0.1 to 1200 ppm indium, preferably 100 to 500 ppm indium, and 0.1 to 1000 ppm bismuth, preferably 50 to 500 ppm bismuth, and 0.1 to 1000 ppm lead, preferably 400 to 600 ppm lead.

Furthermore, an alloy including 0.1 to 1000 ppm lead, preferably 400 to 600 ppm lead, and 0.1 to 1000 ppm indium, preferably 100 to 850 ppm indium, is particularly preferred.

An alloy including 0.1 to 1000 ppm lead, particularly 400 to 600 ppm lead, is also preferred as alloy.

The remainder in these alloy data is zinc.

Investigations have shown that alloying the aforementioned elements does not cause any disadvantages with respect to the electrical properties or battery gassing properties. The zinc powder of the invention can even be used as a lead-free powder for all uses and battery types. Battery tests on the zinc powder or zinc alloy powder with no lead used as alloy element have shown that gassing is extremely low particularly in alkaline round cell types, which also applies to cell types of size C and D of the international classification.

According to their varying mean bulk density, three different zinc powders or zinc powder alloys represent particularly preferred embodiments of the invention. One is a zinc powder or zinc alloy powder with a mean bulk density of from 1.8 to 2.2 g/cm$^3$, preferably from 1.9 to 2.1 g/cm$^3$, and more preferably of 2.0 g/cm$^3$, which will be referred to as LD (low density) powder hereinafter. In a preferred fashion, said LD type zinc powder or zinc alloy powder has the following particle size range-dependent bulk density distribution (Table A) and the following screening distribution (Table B):

TABLE A

| Particle size range [μm] | Bulk density range [g/cm$^3$] |
| --- | --- |
| <250 to 150 | 1.86 to 1.24 |
| <150 to 100 | 2.12 to 1.42 |
| <100 to 75 | 2.32 to 1.54 |
| <75 | 2.82 to 1.88 |

TABLE B

| Particle size range [μm] | Amount [wt.-%] |
| --- | --- |
| ≧400 | 0 |
| <400 to 250 | 1.2 to 0.8 |
| <250 to 150 | 15.6 to 10.4 |
| <150 to 100 | 44.4 to 29.6 |
| <100 to 75 | 20.4 to 13.6 |
| <75 to 40 | 31.2 to 20.8 |
| <40 | 7.2 to 4.8 |

Another particular embodiment of the invention is a zinc powder or zinc alloy powder with a mean bulk density of from 2.5 to 2.9 g/cm$^3$, preferably from 2.6 to 2.8 g/cm$^3$, and more preferably of 2.7 g/cm$^3$, which will be referred to as MD (medium density) powder hereinafter. In a preferred fashion, said MD type zinc powder or zinc alloy powder has the following particle size range-dependent bulk density distribution (Table C) and the following screening distribution (Table D):

TABLE C

| Particle size range [μm] | Bulk density range [g/cm$^3$] |
| --- | --- |
| <250 to 150 | 2.47 to 1.65 |
| <150 to 100 | 2.78 to 1.86 |
| <100 to 75 | 3.34 to 2.22 |
| <75 | 4.02 to 2.68 |

TABLE D

| Particle size range [μm] | Amount [wt.-%] |
| --- | --- |
| ≧400 | 0 |
| <400 to 250 | 1.2 to 0.8 |
| <250 to 150 | 39.6 to 26.4 |
| <150 to 100 | 31.2 to 20.8 |
| <100 to 75 | 12.0 to 8.0 |
| <75 to 40 | 24.0 to 16.0 |
| <40 | 12.0 to 8.0 |

A third particular embodiment of the invention is a zinc powder or zinc alloy powder having a high bulk density of from 3.0 to 3.4 g/cm$^3$, preferably from 3.1 to 3.3 g/cm$^3$, and more preferably of 3.2 g/cm$^3$, which will be referred to as HD (high density) powder hereinafter. In a preferred fashion, said HD type zinc powder or zinc alloy powder has the following particle size range-dependent bulk density distribution (Table E) and the following screening distribution (Table F):

TABLE E

| Particle size range [μm] | Bulk density range [g/cm³] |
| --- | --- |
| <250 to 150 | 2.96 to 1.98 |
| <150 to 100 | 3.37 to 2.25 |
| <100 to 75 | 3.67 to 2.45 |
| <75 | 4.01 to 2.67 |

TABLE F

| Particle size range [μm] | Amount [wt.-%] |
| --- | --- |
| ≧400 | 0 |
| <400 to 250 | 1.2 to 0.8 |
| <250 to 150 | 12.0 to 8.0 |
| <150 to 100 | 30.0 to 20.0 |
| <100 to 75 | 27.6 to 18.4 |
| <75 to 40 | 42.0 to 28 |
| <40 | 7.2 to 4.8 |

The following figures are intended to illustrate the invention in greater detail. The figures show electron-microscopic images of LD, MD and HD type zinc powders of the invention, including the morphology of the overall distribution and specific particle sizes of the fractions <75 μm and >150 μm.

Figure 1:
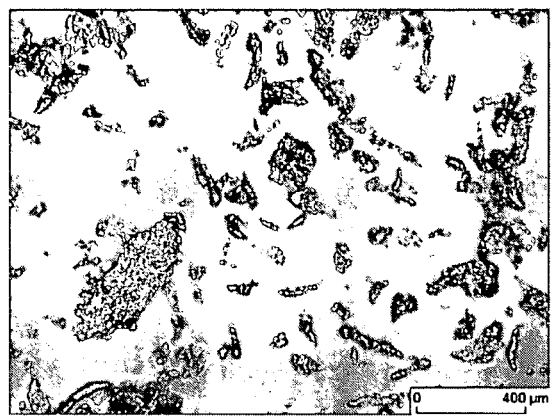
FIG. 1 is an exemplary illustration of an LD type zinc powder according to the invention in its overall distribution (low bulk density of 2.0 g/cm³), which is not in relation to the real quantitative distribution.
Figure 2:
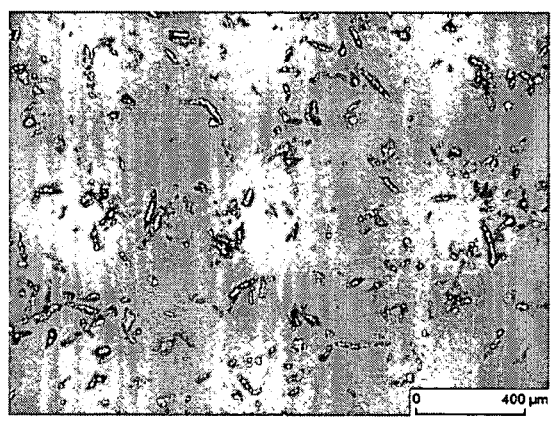
FIG. 2 illustrates the fraction <75 μm of the LD type, not in relation to the real quantitative distribution. This fraction is remarkable for its relatively round particle shape which, however, is more oblong than that of the MD type.
Figure 3:
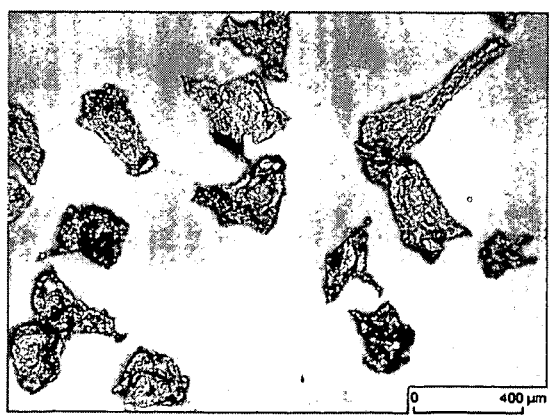
FIG. 3 illustrates the fraction >150 μm of the LD type, not in relation to the real quantitative distribution. This fraction is remarkable for its markedly platelet-like particle shape.
Figure 4:
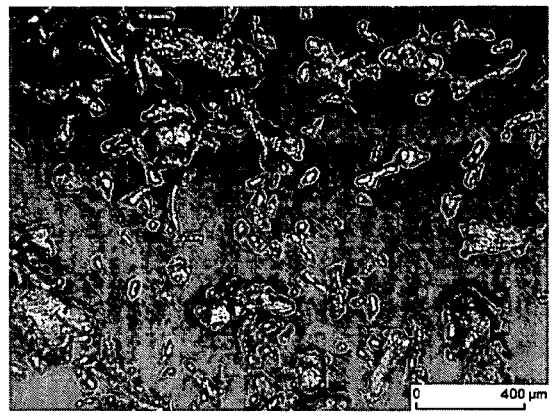
FIG. 4 is an exemplary illustration of an MD type zinc powder according to the invention in its overall distribution (mean bulk density 2.7 g/cm³), which is not in relation to the real quantitative distribution.
Figure 5:
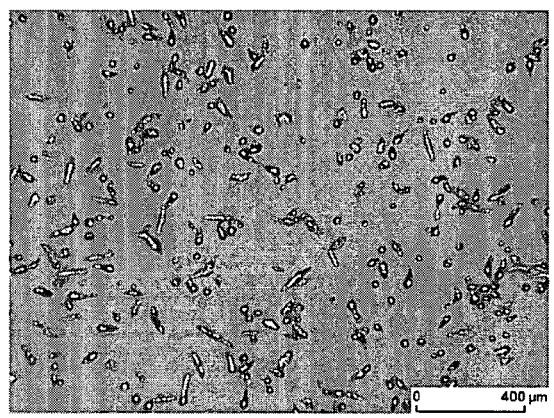
FIG. 5 illustrates the fraction <75 μm of the MD type, not in relation to the real quantitative distribution. This fraction is remarkable for its relatively round particle shape.
Figure 6:
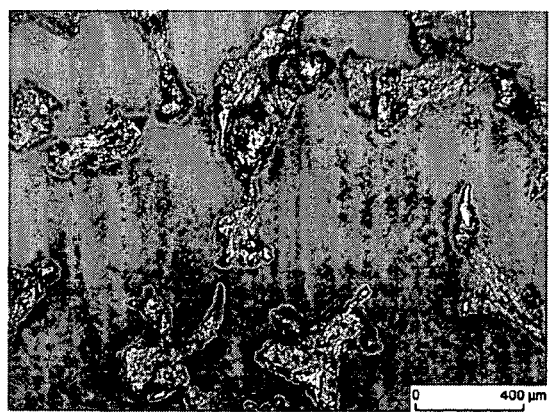
FIG. 6 illustrates the fraction >150 μm of the MD type, not in relation to the real quantitative distribution. This fraction exhibits a markedly needle-like, platelet particle shape.
Figure 7:
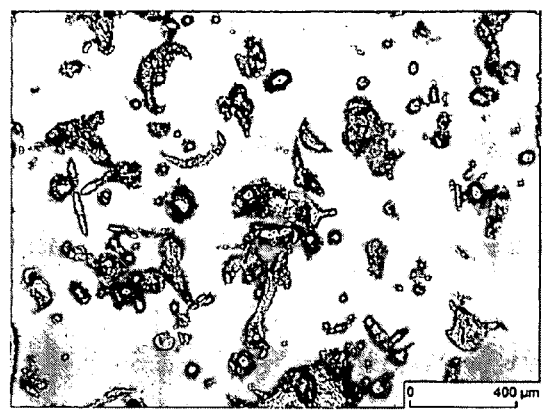
FIG. 7 is an exemplary illustration of an HD type zinc powder according to the invention in its overall distribution (mean bulk density 3.2 g/cm³), which is not in relation to the real quantitative distribution.
Figure 8:
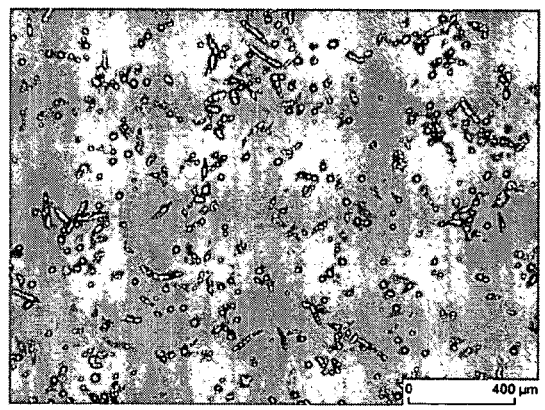
FIG. 8 illustrates the fraction <75 μm of the HD type, not in relation to the real quantitative distribution. This fraction is remarkable for its relatively round particle shape.
Figure 9:
FIG. 9 illustrates the fraction >150 μm of the HD type, not in relation to the real quantitative distribution. This fraction exhibits a markedly needle-like, significantly more platelet-like particle shape.

In a preferred embodiment, it is also possible to combine the inventive zinc powders or zinc alloy powders, particularly the above-mentioned LD, MD and HD type powders, with other, conventional zinc powders or zinc alloy powders of the prior art, or with each other, thereby creating mixtures such as double distributions.

One preferred embodiment therefore comprises mixtures of zinc powders or zinc alloy powders including conventional zinc powders or zinc alloy powders of the prior art with a bulk density of from 2.8 to 3.0 g/cm³ in mixture with LD, MD or HD type powders. Particularly preferred is admixing an LD type powder. In a preferred fashion, the admixture is at least 5 wt.-%, preferably from 10 to 80 wt.-%.

Such double distributions result in very good high-power properties in the battery. The second zinc powder should have a particle size distribution as present in powders or zinc alloy powders conventional for batteries. At present, zinc powders or zinc alloy powders are conventionally used according to the state of the art, wherein the particle size is in a wide range of about 20 to 500 μm. In a preferred fashion, the particle size distribution measured according to ASTM 214 should be in a range of from 75 to 500 μm. When using the zinc powder of the invention, the positive effect on the battery properties can be determined unequivocally upon addition of only 5 wt.-%. There is no restriction in the mixing ratio of these zinc powders or zinc alloy powders. Depending on the desired battery properties, the mixing ratio can be adjusted in a controlled fashion.

Also, mixtures of the inventive zinc powders or zinc alloy powders of varying mean bulk density with each other are particularly preferred. In this way, it is possible to adjust the mean bulk density in a controlled fashion via the amount of each powder.

Thus, it is possible to use mixtures of the types LD, MD and HD of varying bulk density with each other, the powder having lower bulk density being admixed in each case. Thus, for example, an HD powder can be mixed with an LD powder in amounts of at least 5 wt.-%, preferably from 10 to 80 wt.-%. However, it is also possible to mix an MD powder with an LD powder, the LD powder being admixed in amounts of at least 5 wt.-% and preferably from 10 to 80 wt.-% in this case as well. Also preferred is a mixture of an HD powder with an MD powder, in which case the MD powder is admixed, likewise in amounts of at least 5 wt.-% and preferably from 10 to 80 wt.-%.

The zinc powder or zinc alloy powder or the mixtures thereof are suitable for use in all alkaline round cells of the international types AAAA, AAA, AA, C, D, etc., as well as in all types of button cells wherein zinc powders or zinc alloy powders are used. For example, these include zinc/air button cells, alkaline manganese button cells and zinc/silver oxide button cells. For use in button cells, amalgamated zinc powder still is frequently employed which contains mercury in amounts of about 0.15 to 6 wt.-%. If such an amalgamation is desired, the zinc powder or zinc alloy powder of the invention can be subjected to an additional surface amalgamation. Owing to its low gassing, however, the powder can also be used with no mercury added, in which case the mercury content is below 1 ppm.

The production of the zinc powder or zinc alloy powder according to the invention proceeds in a per se known fashion. The zinc or zinc alloy particles are produced from liquid zinc or liquid zinc alloys according to various methods. For example, spraying or granulating on a rotating granulator plate is effected, allowing particle size, particle size distribution and outer shape of the particles to be adjusted depending on the process conditions. A special protective gas chamber is not necessarily required. Where specific particle size distributions are desired, it is also possible to set up appropriate screening fractions including the individual particles with the respective particle size distribution. These particles can be remixed at a desired particle size distribution and bulk density. Frequently, screening fractions are separated from oversize and undersize.

In a preferred fashion, the zinc powder or zinc alloy powder of the invention is used in alkaline cells. Such alkaline cells are well-known in the prior art and have been described in WO 99/07030, for example. These alkaline cells normally have an anode made of zinc powder or zinc alloy powder and cathodes made of manganese dioxide or other materials such as air or silver oxide. For an anode, the alkaline zinc alloy powder is solidified in an electrolyte liquid using well-known gelating agents or other additives in order to stabilize the particulate zinc or particulate zinc alloy and obtain a preferably ideal distribution within the electrode.

The zinc powder or zinc alloy powder of the invention has a favorable particle size range and a favorable particle size-dependent bulk density distribution and can be used for batteries in all alkaline round cells and button cells. Furthermore, the zinc powder or zinc alloy powder of the invention achieves low battery gassing even without addition of lead, cadmium and mercury as alloy elements, thus providing a powder which can be used universally in all alkaline battery types.

The following examples are intended to illustrate the invention in more detail.

EXAMPLES

Zinc powders including various alloy components were produced according to the methods mentioned in the description. Three different mean bulk densities were adjusted by means of process technology. Furthermore, the inventive zinc powders were used with standard zinc powders at varying mixing ratios. Naturally, intermediate mean bulk densities can also be produced with ease and, depending on the use thereof, are highly suitable.

1. Type 1: LD (low density) with a mean bulk density of about 2,0 g/cm$^3$
2. Type 2: MD (medium density) with a mean bulk density of about 2.7 g/cm$^3$
3. Type 3: HD (higher density) with a mean bulk density of about 3.2 g/cm$^3$ Battery tests on LR6 (AA) and LR14 (C) cells were performed. To this end, mixtures of the new types of zinc powders with standard zinc powders were also produced and tested. In all of the cases, the cells showed outstanding battery properties compared to standard zinc powders, and battery gassing was significantly lower in all of the cases. Using LR14 (C) cells as well, gassing was determined following an ON discharge of from 40 to 270 minutes at 2 ohms and subsequent storage of the batteries for 7 days at 70° C. In all of the cases, gassing was at values below 4 ml gas/cell. Particularly remarkable were the exceedingly low gassing values in the 40 minutes discharge, which likewise were below 4 ml per cell. Merely LD powder alone did not show any improvement, but has high discharge properties when combined with standard zinc powders. In contrast to a standard powder, an improvement by a factor of up to 20 is achieved.

In addition, a standard gassing (out-of-cell gas test) was performed. To this end, 25 g of zinc powder was placed in a glass flask together with 135 ml of 36% KOH and 4% ZnO. Evolution of hydrogen was determined after one days at 45° C. The gassing values of the zinc powder according to the invention were in the range of the standard zinc powder, but significantly lower than those of the fine standard zinc powder. The flow rate was measured according to ASTM B213 (50 g 1/10" No. 1-2288).

Table 1 shows the particle size distribution, the bulk density of two specific screening fractions, the mean bulk density and the results of gassing tests with various zinc alloy powders of the invention and with standard alloy powders.

Table 2 shows the screening distribution in wt.-% of the inventive LD, MD and HD type zinc powders compared to standard zinc powders. The particle size is given in μm. As can be seen, the zinc powders of the invention have a completely different screening distribution compared to the standard zinc powders. Conspicuously, it is especially the particle size ranging from 75 to 40 μm in the zinc powders of the invention which is present in higher amounts compared to standard zinc powders. The reverse applies to particle sizes ranging from 250 to 150 μm which are present in higher amounts in standard zinc powders.

TABLE 2

Screening distribution

| Particle size [μm] | LD powder (mean bulk density 2.0 g/cm$^3$) screening fraction [wt.-%] | MD powder (mean bulk density 2.7 g/cm$^3$) screening fraction [wt.-%] | HD powder (mean bulk density 3.2 g/cm$^3$) screening fraction [wt.-%] | Standard zinc powder 1 screening fraction [wt.-%] | Standard zinc powder 2 screening fraction [wt.-%] |
|---|---|---|---|---|---|
| >400 | 0 | 0 | 0 | 0 | 0 |
| 400-250 | 1 | 1 | 1 | 8 | 11 |
| 250-150 | 13 | 33 | 10 | 28 | 38 |
| 150-100 | 37 | 26 | 25 | 27 | 24 |
| 100-75 | 17 | 10 | 23 | 12 | 15 |
| 75-40 | 26 | 20 | 35 | 21 | 12 |
| <40 | 6 | 10 | 6 | 4 | 0 |

Table 3 shows the particle size-dependent bulk density distribution in LD, MD and HD type zinc powders compared to standard zinc powders. Conspicuously, the bulk density distribution over each particle size range is highly inhomogeneous in the zinc powders of the invention, decreasing strongly with increasing particle size. In contrast, the comparable bulk densities in standard zinc powders are relatively homogeneous in all particle size ranges.

TABLE 3

Bulk density in g/cm$^3$

| Particle size [μm] | LD powder (mean bulk density 2.0 g/cm$^3$) screening fraction [wt.-%] | MD powder (mean bulk density 2.7 g/cm$^3$) screening fraction [wt.-%] | HD powder (mean bulk density 3.2 g/cm$^3$) screening fraction [wt.-%] | Standard zinc powder 1 screening fraction [wt.-%] | Standard zinc powder 2 screening fraction [wt.-%] |
|---|---|---|---|---|---|
| >400 | — | — | — | — | — |
| 400-250 | — | — | — | 2.73 | 2.87 |
| 250-150 | 1.55 | 2.06 | 2.47 | 2.74 | 2.82 |
| 150-100 | 1.77 | 2.32 | 2.81 | 2.81 | 2.89 |
| 100-75 | 1.93 | 2.78 | 3.06 | 2.84 | 2.89 |
| <75 | 2.35 | 3.35 | 3.34 | 2.87 | 2.82 |

Assessment of the Discharge Results with LR 6 Cells

Discharge investigations according to Standard ANSI Digital Camera and ANSI Photo Flash were performed on LR6 cells, using a conventional standard powder as comparative zinc powder.

Test 1: ANSI Digital Camera: 1000 mA, continuous, cell-end voltage 1.0 V. The discharge result of a conventional standard powder is set to 100%. The percent figures indicate the capacity of the measured powder in percent.

Test 2: ANSI Photo Flash: 1000 mA, 10 s/min, 1 h/d, cell-end voltage 0.9 V. The percent figures relate to the discharge cycles determined, because this is not a continuous discharge as in Test 1.

Table 4 shows the discharge results. As can be seen, the discharge results with mixtures of inventive zinc alloy powders with each other or with standard zinc alloy powders are superior by a factor of two to three. Hence, the zinc alloy powders of the invention and mixtures including same are excellently suited for use in alkaline cells and, in particular, have outstanding high-power properties.

TABLE 4

Discharge results with LR 6

| Alloy [ppm] | Bulk density [g/cm$^3$] | Test 1 [%] | Test 2 [%] |
|---|---|---|---|
| 500Pb/500Bi/500In (standard) | 2.8 | 100 | 100 |
| HD 500Pb/500Bi/500In | 3.2 | 103 | 102 |
| 500Pb/500Bi/500In (standard) + 10% LD 500Pb/500Bi/500In | 2.7 | 118 | 174 |
| 500Pb/500Bi/500In (standard) + 50% LD 500Pb/500Bi/500In | 2.4 | 126 | 322 |
| 500Pb/500Bi/500In (standard) + 70% LD 500Pb/500Bi/500In | 2.2 | 132 | 338 |
| HD 500Pb/500Bi/500In + 10% LD 500Pb/500Bi/500In | 2.9 | 132 | 252 |
| HD 500Pb/500Bi/500In + 20% LD 500Pb/500Bi/500In | 2.7 | 136 | 295 |
| HD 500Pb/500Bi/500In + 50% LD 500Pb/500Bi/500In | 2.3 | 142 | 303 |
| 300Bi/300In (standard) | 2.9 | 100 | 100 |
| HD 300Bi/300In | 3.1 | 105 | 159 |
| MD 300Bi/300In | 2.7 | 107 | 161 |
| 300Bi/300In (standard) + 20% LD 300Bi/300In | 2.8 | 110 | 159 |
| HD 300Bi/300In + 20% LD 300Bi/300In | 2.9 | 110 | 204 |
| 200Bi/200In/80Al (standard) | 2.7 | 100 | 100 |
| 200Bi/200In/80Al (standard) + 20% LD 300Bi/300In | 2.7 | 105 | 136 |

The invention claimed is:

1. A zinc powder or zinc alloy powder comprising an inhomogeneous bulk density distribution depending on particle size, wherein the difference of the bulk density measured according to ASTM B212 in the particle size range smaller than 75 μm and that in the particle size range greater than 150 μm is at least 0.5 g/cm$^3$, and the mean bulk density of the powder, measured according to ASTM B212, ranges from 1.8 to 4.0 g/cm$^3$.

2. The zinc powder or zinc alloy powder according to claim 1, wherein the difference of the bulk density in the particle size range smaller than 75 μm and that of the particle size range greater than 150 μm is from 0.5 g/cm$^3$ to 2.0 g/cm$^3$.

3. The zinc powder or zinc alloy powder according to claim 1 wherein the differences of the bulk densities have a particle size-dependent distribution further comprising:
    smaller than 75 μm vs. smaller than 100 to 75 μm of at least 0.13 g/cm$^3$,
    smaller than 100 to 75 μm vs. smaller than 150 to 100 μm of at least 0.13 g/cm$^3$, and
    smaller than 150 to 100 μm vs. 250 to 150 μm of at least 0.13 g/cm$^3$.

4. The zinc powder or zinc alloy powder according to claim 1, wherein the differences of the bulk densities have a particle size-dependent distribution further comprising:
    smaller than 75 μm vs. smaller than 100 to 75 μm of from 0.15 to 0.5 g/cm$^3$,
    smaller than 100 to 75 μm vs. smaller than 150 to 100 μm of at least 0.15 to 0.5 g/cm$^3$;
    smaller than 150 to 100 μm vs. 250 to 150 μm of at least 0.15 to 0.5 g/cm$^3$.

5. The zinc powder or zinc alloy powder according to claim 1 wherein said zinc alloy is comprised of zinc and one or more other metal alloy elements selected from the group of indium, bismuth, lead, aluminum, calcium, lithium, sodium, magnesium, or mixtures thereof.

6. The zinc powder or zinc alloy powder according to claim 1, wherein said zinc alloy is comprised of zinc and one or more other metal alloy elements selected from the group of indium, bismuth, lead, aluminum, calcium, lithium, sodium, magnesium, or mixtures thereof, and wherein said metal alloy elements are further selected from the group of: 0.1 to 1200 ppm indium, 0.1 to 1000 ppm bismuth, 0.1 to 1000 ppm lead, 0.1 to 200 ppm aluminum, 0.1 to 200 ppm calcium, 0.1 to 200 ppm lithium, 0.1 to 200 ppm sodium, 0.1 to 200 ppm magnesium, or mixtures thereof.

7. The zinc powder or zinc alloy powder according to claim 1, wherein said zinc or zinc alloy powder is comprised of 0.1 to 1200 ppm indium and 0.1 to 1000 ppm bismuth.

8. The zinc powder or zinc alloy powder according to claim 1, wherein said zinc or zinc alloy powder is comprised of 0.1 to 1200 ppm indium, 0.1 to 1000 ppm bismuth, and 0.1 to 1000 ppm lead.

9. The zinc powder or zinc alloy powder according to claim 1, wherein said zinc or zinc alloy powder is comprised of 0.1 to 1000 ppm lead and 0.1 to 1000 ppm indium or bismuth.

10. The zinc powder or zinc alloy powder according to claim 1, wherein said zinc or zinc alloy powder is comprised of 0.1 to 1000 ppm lead.

11. The zinc powder or zinc alloy powder according to claim 1, wherein said zinc or zinc alloy powder is comprised of 0.1 to 1000 ppm indium, 0.1 to 1000 ppm bismuth, and 0.1 to 200 ppm aluminum.

12. The zinc powder or zinc alloy powder according to claim 1, wherein said zinc or zinc alloy powder comprises an amalgamated zinc powder.

13. The zinc powder or zinc alloy powder according to claim 12, wherein said zinc powder or zinc alloy powder is amalgamated with about 0.1 to 7 wt.-% mercury.

14. The zinc powder or zinc alloy powder according to claim 1 wherein the zinc powder or zinc alloy powder comprises a low density powder having a mean bulk density of from 1.8 to 2.2 g/cm$^3$.

15. The zinc powder or zinc alloy powder according to claim 1 wherein the zinc powder or zinc alloy powder comprises a medium density powder having a mean bulk density of from 2.5 to 2.9 g/cm$^3$.

16. The zinc powder or zinc alloy powder according to claim 1 wherein the zinc powder or zinc alloy powder comprises a high density powder having a mean bulk density of from 3.0 to 3.4 g/cm$^3$.

17. The zinc powder or zinc alloy powder according to claim 1 comprising a mixture of zinc powders or zinc alloy powders with a bulk density of from 2.8 to 3.0 g/cm$^3$ with a zinc powder or zinc alloy powder further comprising a low density powder having a mean bulk density of from 1.8 to 2.2 g/cm$^3$.

18. The zinc powder or zinc alloy powder according to claim 1 comprising:
a mixture of zinc powders or zinc alloy powders with a bulk density of from 2.8 to 3.0 g/cm$^3$ with a zinc powder or zinc alloy powder further comprising a medium density powder having a mean bulk density of from 2.5 to 2.9 g/cm$^3$.

19. The zinc powder or zinc alloy powder according to claim 1 comprising a mixture of zinc powders or zinc alloy powders with a bulk density of from 2.8 to 3.0 g/cm$^3$ with a zinc powder or zinc alloy powder further comprising a high density powder having a mean bulk density of from 3.0 to 3.4 g/cm$^3$.

* * * * *

UNITED STATES PATENT AND TRADEMARK OFFICE
CERTIFICATE OF CORRECTION

PATENT NO. : 7,323,031 B2  Page 1 of 1
APPLICATION NO. : 10/754271
DATED : January 29, 2008
INVENTOR(S) : Armin Melzer et al.

It is certified that error appears in the above-identified patent and that said Letters Patent is hereby corrected as shown below:

At column 10, line 16, after "group" insert --consisting--.

At column 10, line 21, after "group" insert --consisting--.

Signed and Sealed this

Twenty-ninth Day of April, 2008

JON W. DUDAS
*Director of the United States Patent and Trademark Office*